United States Patent Office 3,532,896
Patented Oct. 6, 1970

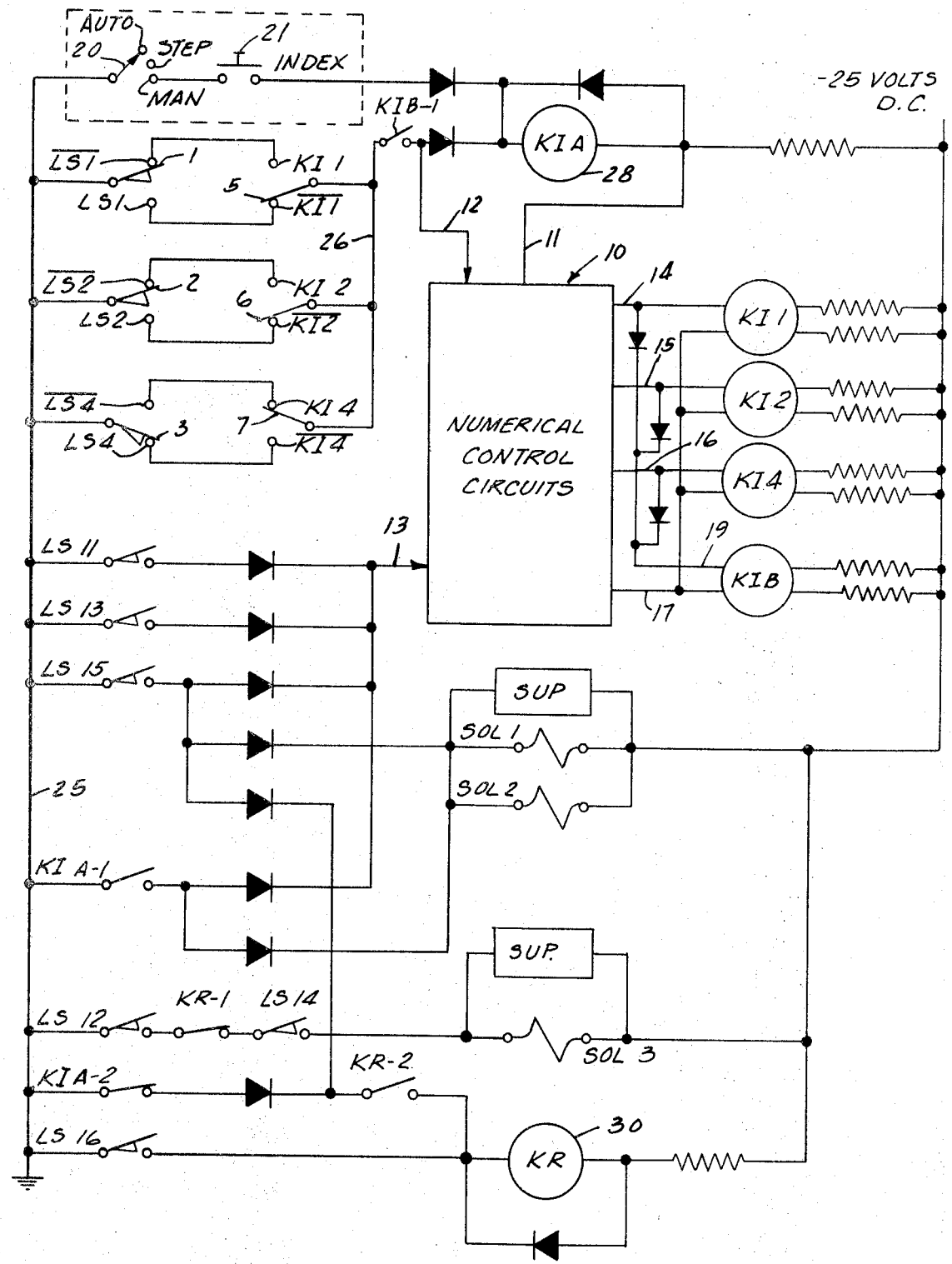

3,532,896
CONTROL FOR TURRET PRESS
Donald W. Rhea, North Plainfield, N.J., assignor to Argus Manufacturing Co., Chicago, Ill., a corporation of Illinois
Filed May 13, 1969, Ser. No. 824,163
Int. Cl. H02j 3/14
U.S. Cl. 307—41                                            1 Claim

ABSTRACT OF THE DISCLOSURE

A turret indexing control circuit for a punch press for effecting indexing operation directly from a binary coded input.

CROSS-REFERENCE TO RELATED APPLICATION

The indexing system of the present invention is especially adapted for use with the punch press turret assembly of copending application U.S. Ser. No. 744,158 filed July 11, 1968 and assigned to the same assignee as the present application. The disclosure of the copending application is incorporated herein by reference in its entirety.

SUMMARY OF THE INVENTION

It is an object of the present invention to provide a turret indexing system which is directly responsive to binary coded positioning commands.

Another object of the present invention is to provide a control for a turret press which insures reliable indexing operation for punch and die turrets which are selectively interlocked for joint indexing movement.

Other objects, features and advantages of the present invention will be apparent from the following detailed description taken in connection with the accompanying drawing.

BRIEF DESCRIPTION OF THE DRAWING

The single figure of drawing shows an exemplary electric circuit for a turret indexing system in accordance with the present invention.

DESCRIPTION OF THE PREFERRED EMBODIMENT

In the illustrated embodiment, turret position is signaled by means of a series of limit switches 1, 2 and 3. Each limit switch is illustrated as having two positions, the respective upper positions being designated $\overline{LS1}$, $\overline{LS2}$, and $\overline{LS4}$, and the respective lower positions being designated LS1, LS2 and LS4. The upper positions of the limit switches may be thought of as the logical zero positions, while the lower positions may be thought of as representing the logical one condition in a system of binary notation, and the limit switches 1, 2 and 3 may represent weights in the binary system of notation of 1, 2 and 4, respectively. Thus, the condition of the limit switches as shown in the drawing may be represented in binary notation by the number "100" (the most significant digit being at the left) and may be thought of as representing position number 4 of the turret to be controlled by the illustrated system. Physically, the limit switches 1, 2 and 3 may be disposed adjacent a part movable with the turret of a punch press, such part having notches arranged for actuating the respective limit switches in the respective turret positions in accordance with the desired binary notation. Thus, in turret position number 4, the turret part would maintain limit switches 1 and 2 in a nonactuated condition, while the turret part would present a notch to the follower of limit switch 3, allowing the limit switch 3 to assume an actuated condition, for example under the impetus of a suitable spring bias on the follower arm.

For the purpose of signalling a desired turret position, a series of relays KI1, KI2 and KI4 are illustrated having respective contacts 5, 6 and 7. The upper and lower positions of the respective contacts have been designated KI1, $\overline{KI1}$, KI2, $\overline{KI2}$, KI4 and $\overline{KI4}$. The positions KI1, KI2 and KI4 may be considered the logical one conditions of the respective relays, while the positions $\overline{KI1}$, $\overline{KI2}$ and $\overline{KI4}$ may be considered the logical zero conditions. Thus, weighting the respective relay positions in correspondence with the weightings of the limit switch positions, the contact condition illustrated in the drawing may be represented in binary notation by the number "100" in conformity with the condition represented by the limit switch contacts.

The following truth table will serve to summarize the operation of the relays and limit switches just described.

TURRET POSITION TRUTH TABLE

| | | KI Relays | | | | Limit switches | | | |
|---|---|---|---|---|---|---|---|---|---|
| | | 1 | 2 | 4 | | 1 | 2 | 4 | |
| Turret position (X=Logical one. 0=Logical zero). | 1.... | X | 0 | 0 | 1.... | 0 | X | X | Limit switch condition (X=Logical zero. 0=Logical one). |
| | 2.... | 0 | X | 0 | 2.... | X | 0 | X | |
| | 2.... | X | X | 0 | 3.... | 0 | 0 | X | |
| | 4.... | 0 | 0 | X | 4.... | X | X | 0 | |
| | 5.... | X | 0 | X | 5.... | 0 | X | 0 | |
| | 6.... | X | X | 0 | 6.... | 0 | 0 | X | |
| | X=Relay energized. 0=Relay deenergized. | | | | X=Limit switch follower in a notch. 0=Follower out of notch. (Between stations the limit switches register 000, all limit switches clear of notches.) | | | | | |

By way of example, the present circuit may be associated in a conventional manner with a numerical control for the punch press, and for the sake of example only a numerical control circuits component is indicated at 10. The component 10 is interconnected with the circuit of the present invention by means of lines designated by reference numerals 11–17. The exact nature of the numerical control circuits component 10 is immaterial to the present invention, and in fact an adequate understanding of the present invention can be obtained by assuming that the rectangle 10 contains manually operable single pole switches in association with lines 11 and 14–17 for selectively presenting an open circuit or a ground potential to the associated lines of the illustrated circuit. Lines 12 and 13 are in the nature of input lines to the component 10, and their function can be adequately understood if it is assumed that the lines 12 and 13 lead to indicator lamps in series with a suitable potential supply so that if the circuit of the present invention supplies ground to line 12 the associated lamp will be energized to indicate that an indexing operation is required, while a ground applied to line 13 would energize a light indicating that an indexing operation is in progress. It is, of course, a matter of routine skill to adapt existing numerical controls so as to operate the illustrated circuit in response to a punched tape which shows desired turret position in binary coded decimal notation. For a six position turret assembly such as here contemplated, it would then be unnecessary to convert the binary coded decimal signal from the tape, the signal from the tape being in suitable form for directly controlling the lines 14, 15 and 16 of the present invention.

It will be observed that whenever a ground potential is supplied to one or more of lines 14, 15 and 16, ground potential is also transmitted to energizing line 19 of relay KI B. Thus, with the illustrated condition of the relay contacts, a ground potential would have been applied to line 16 so as to latch relays KI4 and KI B, so that normally open contacts KI B-1 would properly be shown in closed condition in conformity with the actuated condition for contact KI4. In the illustrated embodiment, it is contemplated that applying a ground potential to line 17 will unlatch or reset each of the relays KI1, KI2, KI4 and KI B.

Also indicated in the drawing is a manually operated selector switch 20 which is shown in the automatic position but which is shiftable to select a "Step" or a "Manual" mode. As will be apparent, if selector switch 20 is placed in the manual mode, indexing may be initiated by means of a push button 21 which serves to selectively energize a relay KI A. The relay KI A when energized causes normally open contact KI A-1 to be closed and causes normally closed contact KI A-2 to be opened. Thus, manual selector 20 provides a means for energizing relay KI A even when relay KI B is deenergized and its contacts KI B-1 are open. A ground signal from component 10 to line 11 would, however, prevent such manual control of relay KI A, and this would be desirable since a ground signal on line 11 indicates that the machine is not in condition for an indexing operation.

In the illustrated embodiment additional limit switches LS11 through LS16 are indicated and for the particular embodiment previously referred to, the limit switches may be operated under the following conditions: LS11 is actuated to open condition when the die turret is fully locked to the frame to prevent rotation thereof; LS12 is actuated to closed condition when the die turret is fully unlocked from the frame so as to permit indexing rotation thereof; LS13 is actuated to open condition when the punch turret is fully locked to the frame; LS14 is actuated to closed condition when the punch turret is fully unlocked from the frame; LS15 is actuated to open condition when the turret indexing drive is fully returned; and LS16 is actuated to closed condition when the turret indexing drive is in its fully advanced condition.

By way of example and not by way of limitation, four way single solenoid spring offset valves may control the locking and unlocking of the die turret and the punch turret. The solenoid SOL 1 as shown in the drawing may control the supply of actuating fluid to respective opposite ends of a fluid pressure operated cylinder which in one condition locks the die turret to the frame and in an opposite condition unlocks the die turret from the frame. Thus with proper operation of the control, energization of solenoid SOL 1 will result in the actuation of limit switch LS11 to opened condition and the actuation of limit switch LS12 to closed condition. Similarly solenoid SOL 2 may control a second fluid pressure operated piston and cylinder assembly which in one condition locks the punch turret to the frame and in an opposite condition unlocks the punch turret from the frame and locks the punch and die turrets together for joint indexing roation. Thus, with proper operation, the energization of solenoid SOL 2 will actuate limit switch LS13 to closed condition and will actuate limit switch LS14 to closed condition.

Referring to the ilustrated circuit, it will be observed that if ground potential is removed from line 11, and if one or more of the relays KI1, KI2 and KI4 is energized, the circuit will be conditioned for an indexing operation. If the commanded position as represented by the condition of the KI relay contacts does not conform with the actual position of the turret as represented by limit switches LS1, LS2 and LS4, a ground potential is transmitted from line 25 to line 26 and through contact KI B-1 so as to cause energization of energizing coil 28 of the KI A relay. Thereupon closure of contacts KI A-1 will supply ground potential from line 25 to solenoids SOL 1 and 2 energizing these solenoids. As previously explained, with proper operation, energization of solenoids SOL 1 and 2 will result in closure of limit switches LS11 and LS13, so that multiple ground potential signals are supplied to input line 13 of component 10. Any one such input signal signifies that an indexing operation is in progress.

With the completion of the operation initiated by energization of solenoids SOL 1 and 2, limit switches LS12 and LS14 will be closed signifying that the die turret is fully unlocked and the punch and die turrets are fully locked together in readiness for an indexing operation. Closure of these limit switches completes an energizing path from ground line 25 through solenoid SOL 3 so as to initiate an indexing stroke of the turret. By way of example, such an indexing stroke may rotate the turret through 60°, so that the condition of limit switches LS1, LS2 and LS4 will then signify a new turret position such as 101 (turret position number 6). At the completion of an indexing advance stroke, limit switch LS16 is closed energizing coil 30 of the KR relay, opening the normally closed contact KR-1 thereof and closing the normally opened contact KR-2 thereof, the latter contact providing a holding circuit for relay KR through limit switch LS15. With the deenergization of solenoid SOL 3, the indexing drive is retracted in preparation for another indexing movement. If, however, the new position of the turret corresponds to the commanded position, ground potential will be removed from energizing coil 28 of relay KIA, and contact KIA-2 will close holding relay KR energized even after opening of limit switch contact LS15 at the full return of the indexing drive. If relay KR is maintained in the energized state in this manner, contact KR-1 thereof will be open and will prevent a further energization of solenoid SOL 3. Further, the input line 12 to component 10 will now signal an open circuit condition signifying that indexing operation is no longer necessary. Further, the release of relay KIA will result in the opening of contact KIA-1, deenergizing solenoids SOL 1 and SOL 2, returning the circuit essentially to its initial condition. Ground potential may then be applied to line 11 to prevent further indexing movement, and a momentary ground potential may be applied to line 17 to unlatch relays KI1, KI2, KI4 and KI B. If the parts are properly restored to initial condition, limit switches LS11, LS13 and LS15 will each open as well as relay contact KI A-1, removing ground potential from input line 13 to signify that an indexing operation is no longer in progress.

Of course, if the first indexing operation moving the turret, for example, to position number 5, did not satisfy the input command as registered by contacts KI1, KI2, and KI4, a second indexing operation would automatically be initiated as soon as the index drive returning to its initial condition causes the opening of limit switch LS15 and the consequent deenergzation of relay KR to again energize solenoid SOL 3.

It is believed that it will be apparent to those skilled in the art how the circuit of the present invention may be applied to the turret assembly of the copending application Ser. No. 744,158 previously referred to. Further, in one commercially available numerical control, the binary coded decimal commands with respect to turret position are supplied to a binary coded decimal to decimal converter so that turret position is sensed in decimal mode. By the present invention, such binary coded decimal to decimal converter is omitted, and the turret position is sensed in the same binary code as the input command from punched tape. Otherwise, the conventional numerical control may essentially be substituted as the component 10 of the drawings, of the present application.

SUMMARY OF OPERATION

For the following summary of operation it may be assumed for simplicity that component 10 contains manually operated switches for selectively applying ground potential to lines 11 and 14–17, and contains indicator lamps in association with lines 12 and 13.

With the circuit in deenergized condition KI4 relay contact 7 would be in the lower logical zero representing condition, designated by the notation $\overline{KI4}$. Thus, ground potential from line 25 is transmitted via limit switch contact 3 in its LS4 position and relay contact 7 in its $\overline{KI4}$ position to line 26, but relay coil 28 of relay KIA is not energized so long as normally open contact KIB–1 is opened. This circuit condition assumes that ground has been momentarily applied to line 17 to unlatch or reset the KI relays associated therewith. When system is ready for indexing operation, ground is removed from line 11, and a new input command is applied to lines 14, 15 and 16. For example, if the new desired position is position number one, then a ground potential is momentarily applied to line 14, latching relay KI1 and also latching relay KIB. Latching of relay KI1 would place its contact 5 in the KI1 or logical one condition, while the other relay contacts 6 and 7 would be in the logical zero condition, represented by $\overline{KI2}$ and $\overline{KI4}$. With this condition, ground potential form line 25 would be transmitted through circuits including contacts 1 and 3 (in conditions $\overline{LS1}$, and LS4) to energize relay KIA (providing ground is removed from conductor 11). The result also is the application of a ground potential to line 12 signifying than an indexing operation is required. The energization of relay KIA closes contacts KIA–1 energizing solenoids SOL 1 and 2 and thus conditioning the turret assembly for indexing operation. Closure of contact KIA–1 also supplies a ground potential to conductor 13 signifying that indexing operation is in progress. Opening of relay contact KIA–2 insures that this holding circuit for relay KR will be broken and that relay KR will be deenergized at this time. When the turret assembly is conditioned for an indexing operation, limit switches LS12 and LS14 will be closed energizing solenoid SOL 3 which initiates an indexing stroke, for example of 60°. When the indexing drive reaches its advanced condition, the limit switches 1, 2 and 3 will have assumed a condition representing turret position number 5, for example, namely LS1, $\overline{LS2}$, LS4, so that if the commanded position is KI1, $\overline{KI2}$, $\overline{KI4}$, ground potential will still be applied to conductor 26 via limit switch contact 3 (in condition LS4) and relay contact 7 (in condition $\overline{KI4}$.

With relay KIA remaining energized, the closure of limit switch LS16 at the end of the advance stroke will energize relay KR, opening contact KR–1 and deenergizing solenoid SOL 3, beginning the retracting stroke of the indexing drive. When the drive has fully retracted, limit switch LS15 is opened, breaking the holding circuit for relay KR, and initiating another indexing stroke by means of energization of solenoid SOL 3. The position registering limit switches 1, 2 and 3 will now assume a condition $\overline{LS1}$, LS2, LS4 representing turret position number 6, and an energizing path for relay KIA will remain via $\overline{LS1}$, LS2 and LS4.

At the end of a further indexing stroke, the position register limit switches will achieve the condition LS1, $\overline{LS2}$, $\overline{LS4}$, representing turret position number one, and ground potential will now be removed from conductor 26 causing deenergization of relay KIA. With relay KIA deenergized, contact KIA–2 thereof is closed to hold relay KR energized even after the index drive has returned and limit switch LS15 is opened. Thus, contact KR–1 is held open preventing a further indexing energization of solenoid SOL 3.

Since ground has been removed from conductor 12, a signal is present indicating that an indexing operation is no longer required. Further with relay contact KIA–1 opened, solenoids SOL 1 and 2 are deenergized causing the punch and die turrets to be locked against further indexing movement. The system is now ready to carry out a punching operation or the like, and a ground potential may be applied to conductor 11 to insure that solenoids SOL 1 and SOL 2 remain deenergized. At any desired time, ground potential may be applied momentarily to conductor 17 to reset the relays KI1, KI2, KI4 and KIB, in preparation for a further indexing operation. With the punch and die turrets locked to the frame, limit switches LS11 and LS13 will be opened, and with the index drive returned, limit switch LS15 will be opened, the absence of ground potential at conductor 13 accommodating the next desired operation of the system such as a punching operation where sequenching is automatic. With the illustrated system, any valid positioning command will involve the latching of at least one of the relays KI1, KI2 and KI4 and will also involve the latching of relay KIB. As the punch and die turrets move between successive positions, the limit switches 1, 2 and 3 will assume the condition $\overline{LS1}$, $\overline{LS2}$, $\overline{LS4}$, but with proper operation of the system the relay pattern $\overline{KI1}$, $\overline{KI2}$, $\overline{KI4}$ will not occur when an indexing operation is to take place. The relay KIA is maintained essentially continuously energized during successive indexing of the punch and die turrets, until the commanded position is attained.

Because the illustrated circuit could be impelemented utilizing fluid logic, for example, which would directly control fluid operated means as herein described, it is deemed advisable in the claims to use the generic terminology "energy flow operated means" having reference, for example, to solenoids SOL 1, 2 and 3 of the illustrated embodiment. Further, the term "index-prohibited condition" refers to a condition in the exemplary embodiment where the punch and die turrets are locked against rotation, for example, while the term "index-permitted condition" refers to the condition where the punch and die turrets are interlocked for joint rotation, for example. The term "comparator means" is utilized as a generic term applying in the present embodiment to the arrangement of limit switches 1, 2 and 3 and command relay contacts 5, 6 and 7, for supplying a signal when a commanded position has been reached.

It will be apparent that many modifications and variations may be effected without departing from the scope of the novel concepts of the present invention.

I claim as my invention:

1. In a numerical control system for controlling an indexing operation between a plurality of preselected positions each assigned a plural order binary number wherein first energy flow operated means has an index prohibited condition in which indexing is prohibited and an index-permitted condition in which indexing is permitted, and wheren second energy flow operated means effects successive indexing movements of a load to the successive preselected positions, a plurality of load position responsive binary switches representing respective orders in binary notation and responsive to the position of the load, and assuming respective different patterns of actuation when the load is at the respective different preselected positions in accordance with the respective binary numbers assigned to such preselected positions, a plurality of command binary switches representing respective orders in binary notation and capable of being actuated in respective different patterns corresponding to the respective binary numbers assigned to the preselected positions, comparator means comprising said load position responsive binary switches and said command binary switches for actuation to an indexing-stop condition when the load position responsive switches and the command switches are actuated to corresponding patterns representing the same binary number, and for actuation to an indexing-proceed condition when the switches are actuated to respective different patterns, first energy flow path means connected with the first energy flow operated means and controlled by said comparator means for actuating said energy flow operated means to index-permitted condition in response to the comparator means being actuated to indexing-proceed condition, second energy flow path means connected with the second energy flow operated means and operable when the first energy flow operated means is in index-permitted condition to actuate said second energy flow operated means to effect an indexing movement of the load, and indexing control means controlling repeated actuation of said second energy flow operated means and responsive to the condition of said comparator means for providing for the repeated actuation of said second energy flow operated means until said comparator means is in said indexing-stop condition.

References Cited

UNITED STATES PATENTS

| | | | |
|---|---|---|---|
| 3,205,368 | 9/1965 | Miracle | 307—41 X |
| 3,339,079 | 8/1967 | Kessler | 307—41 X |

ROBERT K. SCHAEFER, Primary Examiner

H. J. HOHAUSER, Assistant Examiner